United States Patent
Yamaguchi et al.

(10) Patent No.: US 6,794,473 B2
(45) Date of Patent: Sep. 21, 2004

(54) ACRYLIC ACID (SALT) POLYMER, ITS PRODUCTION PROCESS AND USES

(75) Inventors: Shigeru Yamaguchi, Yao (JP); Tsuyoshi Hirata, Kobe (JP); Shorbu Shioji, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 66 days.

(21) Appl. No.: 10/126,587

(22) Filed: Apr. 22, 2002

(65) Prior Publication Data

US 2003/0008995 A1 Jan. 9, 2003

(30) Foreign Application Priority Data

May 1, 2001 (JP) ....................................... 2001-134485

(51) Int. Cl.[7] ............................................. C08F 124/00
(52) U.S. Cl. .................... 526/270; 526/317.1; 526/320; 526/333
(58) Field of Search .............................. 526/270, 317.1, 526/320, 333

(56) References Cited

U.S. PATENT DOCUMENTS

| | | | |
|---|---|---|---|
| 4,774,303 A | 9/1988 | Denzinger et al. | .......... 526/212 |
| 5,264,533 A | 11/1993 | Rehmer et al. | |
| 5,389,699 A | 2/1995 | Rehmer et al. | |
| 5,840,372 A | 11/1998 | Rink et al. | |

FOREIGN PATENT DOCUMENTS

| | | |
|---|---|---|
| EP | 0 346 734 | 12/1989 |
| EP | 0 829 765 A1 * | 3/1998 |
| GB | 1593857 | 7/1981 |
| JP | 5430426 | 10/1979 |
| JP | 5731564 | 7/1982 |
| JP | 5736926 | 8/1982 |
| JP | 5738601 | 8/1982 |
| JP | 62270605 | 11/1987 |
| JP | 4268304 | 9/1992 |
| JP | 586125 | 4/1993 |
| WO | WO 93/23443 | 11/1993 |
| WO | WO 03/051940 A1 | 6/2003 |

OTHER PUBLICATIONS

Asmussen et al. International Dental Journal, 1985, 35(2), 160–5.*
Guru et al. Polym.–Plast. Technol. Eng., 1999, 3891), 179–187.*

* cited by examiner

Primary Examiner—Helen L. Pezzuto
(74) Attorney, Agent, or Firm—Roylance, Abrams, Berdo & Goodman, L.L.P.

(57) ABSTRACT

The present invention provides: an acrylic acid (salt) polymer, which has a low molecular weight and a narrow molecular weight distribution and can display excellent dispersibility, or which has a high molecular weight and a high water solubility; a production process that enables easy production of this polymer; and an acrylic acid (salt) polymer composition comprising this polymer. The acrylic acid (salt) polymer is an acrylic acid (salt) polymer of which not less than 1 weight % of the entirety is accounted for by an acrylic acid (salt) polymer having a specific terminal structure. In addition, the production process for an acrylic acid (salt) polymer comprises the step of carrying out polymerization of a monomer component including an acrylic acid (salt), wherein an acrylic acid (salt) having a furfural content of 200 to 400 weight ppm is used as at least a portion of the acrylic acid (salt) in an amount of not smaller than 10 weight % of the entire monomer component.

18 Claims, No Drawings

ACRYLIC ACID (SALT) POLYMER, ITS PRODUCTION PROCESS AND USES

BACKGROUND OF THE INVENTION

A. Technical Field

The present invention relates to an acrylic acid (salt) polymer, its production process, and an acrylic acid (salt) polymer composition comprising this acrylic acid (salt) polymer, wherein the acrylic acid (salt) polymer displays excellent performance, for example, as detergent builders, scale inhibitors, pigment dispersants, thickeners, and flocculants.

B. Background Art

Hitherto, it has been known that acrylic acid (salt) polymers are useful for various uses such as detergent builders, scale inhibitors, pigment dispersants, thickeners, and flocculants, and processes for obtaining these acrylic acid (salt) polymers have variously been proposed so far. For example, processes for obtaining low molecular acrylic acid (salt) polymers, which are fitted for uses such as detergent builders, scale inhibitors, and pigment dispersants, are proposed in JP-A-270605/1987, JP-A-086125/1993, and JP-A-268304/1992. On the other hand, processes for obtaining high molecular acrylic acid (salt) polymers, which are fitted for uses such as thickeners and flocculants, are proposed in JP-B-030426/1979, JP-B-031564/1982, and JP-B-036926/1982.

Desired for the uses such as detergent builders, scale inhibitors, and pigment dispersants are acrylic acid (salt) polymers that have low molecular weights and narrow molecular weight distributions and can display excellent dispersibility. On the other hand, desired for the uses such as thickeners and flocculants are acrylic acid (salt) polymers that have high molecular weights and high water solubilities. Also as to the prior arts as described in the above official gazettes, the improvement of the dispersibility and the solubility is attempted. However, there still remain the following problems: for example, effects of the improvement are not sufficient and are limited in respect to production facilities and procedures.

SUMMARY OF THE INVENTION

A. Object of the Invention

Accordingly, an object of the present invention is to provide: an acrylic acid (salt) polymer, which has a low molecular weight and a narrow molecular weight distribution and can display excellent dispersibility, or which has a high molecular weight and a high water solubility; a production process that enables easy production of this polymer; and an acrylic acid (salt) polymer composition comprising this polymer.

B. Disclosure of the Invention

The present inventors diligently studied to solve the above-mentioned problems. As a result, they have found out that the acrylic acid (salt) polymer, which has a low molecular weight and a narrow molecular weight distribution and can display excellent dispersibility, or which has a high molecular weight and a high water solubility, can be obtained by carrying out polymerization using an acrylic acid (salt) containing furfural in not smaller than a definite amount in the polymerization step and thereby making an aldehyde structure, as derived from the furfural, exist in the resultant polymer.

Acrylic acid as a raw material of the acrylic acid (salt) polymers is conventionally, for example, produced by gas phase oxidation of propylene or acrolein. As to such a process, however, it is known that the production step involves formation of by-products as impurities, such as aldehydes (e.g. furfural). Accordingly, the resultant product contains the impurities in a large amount besides the aimed acrylic acid. Therefore, usually, the impurities were removed by carrying out a purification treatment (for example, distillation) of the resultant product, and thereafter the resultant acrylic acid was provided to the polymerization reactions for obtaining the acrylic acid (salt) polymers (JP-B-038601/1982). Because it was thought that the aldehydes such as furfural contained in acrylic acid had a bad influence as impurities on the polymerization reactions for obtaining the acrylic acid (salt) polymers.

On the contrary to this conventional thought, the findings obtained by the present inventors are that better results are obtained by making the furfural exist in the raw acrylic acid (salt) or in the acrylic acid (salt) polymer rather than by removing the furfural.

The present invention has been completed on the basis of these findings.

That is to say, an acrylic acid (salt) polymer, according to the present invention, is an acrylic acid (salt) polymer of which not less than 1 weight % of the entirety is accounted for by an acrylic acid (salt) polymer having a terminal structure of a formula (1) below:

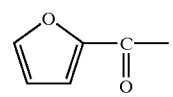

(1)

A production process for an acrylic acid (salt) polymer, according to the present invention, comprises the step of carrying out polymerization of a monomer component including an acrylic acid (salt), with the production process being characterized in that an acrylic acid (salt) having a furfural content of 200 to 400 weight ppm is used as at least a portion of the acrylic acid (salt) in an amount of not smaller than 10 weight % of the entire monomer component.

Then, acrylic acid (salt) polymer composition, according to the present invention, comprises an acrylic acid (salt) polymer wherein a structural unit derived from an acrylic acid (salt) accounts for not less than 10 weight % of the acrylic acid (salt) polymer, with the acrylic acid (salt) polymer composition being characterized by further comprising a compound, as derived from furfural, in an amount of 100 to 50,000 weight ppm.

These and other objects and the advantages of the present invention will be more fully apparent from the following detailed disclosure.

DETAILED DESCRIPTION OF THE INVENTION

Hereinafter, modes for carrying out the present invention are explained in detail.

The acrylic acid (salt) polymer, according to the present invention, is an acrylic acid (salt) polymer of which not less than 1 weight % of the entirety is accounted for by an acrylic acid (salt) polymer having a terminal structure of the aforementioned formula (1).

The aldehyde structure of the aforementioned formula (1) is derived from furfural, and the present invention polymer is easily obtained by the below-mentioned production process.

In the case where the acrylic acid (salt) polymer having the terminal structure of the aforementioned formula (1)

accounts for less than 1 weight % of the entirety, the polymer cannot display excellent dispersibility. Incidentally, as to the present invention acrylic acid (salt) polymer, it is enough that not less than 1 weight % of its entirety is accounted for by the polymer having the aforementioned specific terminal aldehyde structure, and, if this range is satisfied, the other terminal of this polymer is not especially limited.

The present invention acrylic acid (salt) polymer mainly comprises a structural unit derived from the acrylic acid (salt), but may further comprise structural units derived from other copolymerizable monomers below, if necessary. In this case, the amount of the structural unit derived from the acrylic acid (salt) is favorably at least 10 weight %.

In the present invention, the carboxyl group portion of the acrylic acid (salt) polymer may be in any form of an acid form, a partial salt form, a perfect salt form, and their mixture form. Examples of the salt include: salts of alkaline metals, such as sodium and potassium; salts of alkaline earth metals, such as calcium and magnesium; ammonium salts; and salts of organic amines, such as monoethanolamine and triethanolamine. Among these, the salts of alkaline metals such as sodium and potassium are especially favorable, and the sodium salts are particularly favorable. Incidentally, these salts may be used either alone respectively or in combinations with each other.

In favorable modes of the acrylic acid (salt) polymer according to the present invention, the dispersion degree thereof is not more than 3.0. In the case where the dispersion degree is more than 3.0, the clay dispersibility tends to decrease, for example, when the polymer is used as a detergent builder. Incidentally, the dispersion degree is a value calculated by weight-average molecular weight/number-average molecular weight, and represents the molecular weight distribution.

The present invention acrylic acid (salt) polymer favorably has a weight-average molecular weight of 500 to 10,000,000. In the case where the weight-average molecular weight is smaller than 500, the scavengeability of metal ions such as a calcium ion and a magnesium ion tends to decrease. On the other hand, in the case where the weight-average molecular weight is larger than 10,000,000, the water solubility tends to decrease. Especially, when the present invention polymer is used for uses such as detergent builders, scale inhibitors, and pigment dispersants, the weight-average molecular weight is favorably in the range of 1,000 to 10,000. When the present invention polymer is used for uses such as thickeners and flocculants, the weight-average molecular weight is favorably in the range of 100,000 to 10,000,000.

The production process for an acrylic acid (salt) polymer, according to the present invention, comprises the step of carrying out polymerization of a monomer component including an acrylic acid (salt), and it is important that, in the aforementioned monomer component, an acrylic acid (salt) having a furfural content of 200 to 400 weight ppm is used as at least a portion, namely, as a portion or the entirety, of the aforementioned acrylic acid (salt) in an amount of not smaller than 10 weight % of the entire monomer component. Thereby, the acrylic acid (salt) polymer, which has a low molecular weight and a narrow molecular weight distribution and can display excellent dispersibility, or which has a high molecular weight and a high water solubility, can be produced by conventional publicly-known methods without being limited in respect to production facilities and procedures. In addition, for example, a crude acrylic acid (salt) produced by gas phase oxidation of propylene or acrolein can be used exactly as it is in the present invention, because this crude acrylic acid (salt) usually has a furfural content of 200 to 400 weight ppm. Incidentally, in the case where the ratio of the aforementioned acrylic acid (salt) is less than 10 weight % of the entire monomer component, the effects of the present invention cannot be displayed sufficiently.

In the present invention, it is enough that the acrylic acid (salt) having a furfural content of 200 to 400 weight ppm is used. However, it is also favorable to use an acrylic acid (salt) further having: a methoxyhydroquinone content of 40 to 160 weight ppm, a phenothiazine content of 0.1 to 0.5 weight ppm, and/or an acetic acid content of 100 to 5,000 weight ppm. In the case where the methoxyhydroquinone content is less than 40 weight ppm, the preservation stability of the acrylic acid is so low that there is an anxiety about danger of occurrence of sudden polymerization depending upon the preservation conditions. In the case where this content is more than 160 weight ppm, the polymerizability is so low that there is an anxiety about such a problem that the residual monomer remains in a large amount. In the case where the phenothiazine content is less than 0.1 weight ppm, there is an anxiety about the deterioration of the preservation stability of the acrylic acid. In the case where this content is more than 0.5 weight ppm, the polymerizability is so low that there is an anxiety about such a problem that the residual monomer remains in a large amount. In the case where the acetic acid content is less than 100 weight ppm, there is an anxiety about the deterioration of the preservation stability of the acrylic acid. In the case where this content is more than 5,000 weight ppm, there is an anxiety about the deterioration of the polymerizability of the acrylic acid.

As to the monomer component, other monomers copolymerizable with the acrylic acid (salt) can be used jointly with the acrylic acid (salt). Examples of such other copolymerizable monomers include: carboxyl-group-containing polymerizable monomers, such as maleic acid, fumaric acid, and itaconic acid; sulfonic-acid-group-containing polymerizable monomers, such as vinylsulfonic acid, methallylsulfonic acid, allylsulfonic acid, and 3-(meth)allyloxy-2-hydroxypropanesulfonic acid; amide-containing polymerizable monomers, such as (meth)acrylamide and t-butyl(meth) acrylamide; allyl ether polymerizable monomers, such as glycerol mono(meth)allyl ether; hydroxyl-group-containing polymerizable monomers, such as 2-hydroxyethyl (meth) acrylate, allyl alcohol, 3-methyl-3-buten-1-ol (isoprenol), and glycerol mono(meth)acrylate; nitrile polymerizable monomers, such as acrylonitrile; hydrophobic polymerizable monomers, such as methyl (meth)acrylate, ethyl (meth) acrylate, vinyl acetate, and styrene; and their salts. Among these, the carboxyl-group-containing polymerizable monomers, such as maleic acid, fumaric acid, and itaconic acid, are favorable, and unsaturated (poly)alkylene glycol ether monomers are more favorable.

These may be used either alone respectively or in combinations with each other. Incidentally, with regard to the ratio of these copolymerizable monomers to the entire monomer component, there is no especial limitation if the aforementioned ratio of the acrylic acid (salt) is satisfied. However, among the above-exemplifying monomers, the hydrophobic polymerizable monomers tend to damage the water solubility of the resultant polymer, so it is favorable that the ratio of the hydrophobic polymerizable monomers is limited into such a range as not to damage the water solubility.

Incidentally, the above-mentioned unsaturated (poly) alkylene glycol ether monomer means a monomer of a general formula (2) below:

$$YO(R^1O)_mR^2 \qquad (2)$$

where: Y denotes an alkenyl group having 2 to 8 carbon atoms; $R^2$ denotes a hydrogen atom or a hydrocarbon group having 1 to 30 carbon atoms; $R^1O$ denotes one kind of oxyalkylene group having 2 to 18 carbon atoms or a mixture of at least two kinds of such oxyalkylene groups; and m is a molar-number-average degree of addition polymerization of the oxyalkylene groups and denotes a number of 1 to 1,000.

In the aforementioned general formula (2), the number of carbon atoms of the oxyalkylene group $R^1O$ is fitly in the range of 2 to 18, favorably 2 to 8, more favorably 2 to 4. In addition, as to an addition product of at least two alkylene oxides arbitrarily selected from the group consisting of such as ethylene oxide, propylene oxide, butylene oxide and styrene oxide, the addition product may be used in any form of such as random addition, block addition, and alternative addition.

When the polymer is used as a cement dispersant, the oxyalkylene group favorably includes an oxyethylene group as an essential component, more favorably in a ratio of not less than 50 mol %, still more favorably not less than 90 mol %, particularly favorably not less than 95 mol %, in order to ensure the balance between hydrophilicity and hydrophobicity.

In the aforementioned general formula (2), the molar-number-average degree m of addition polymerization of the oxyalkylene groups is fitly in the range of 1 to 1,000. When the polymer is used as a cement dispersant, the molar-number-average degree m of addition polymerization of the oxyalkylene groups is favorably in the range of 2 to 500, more favorably 5 to 500, still more favorably 10 to 500, particularly favorably 15 to 500, most favorably 20 to 300. There is the following tendency: as this molar-number-average degree of addition polymerization decreases, the hydrophilicity of the resultant polymer decreases and the dispersibility therefore deteriorates. On the other hand, in the case where the molar-number-average degree of addition polymerization is larger than 1,000, the copolymerizability tends to lower.

In the aforementioned general formula (2), it is enough that $R^2$ is a hydrogen atom or a hydrocarbon group having 1 to 30 carbon atoms. Specific examples of this hydrocarbon group having 1 to 30 carbon atoms include: alkyl groups (aliphatic or alicyclic alkyl groups) having 1 to 30 carbon atoms; and benzene-ring-containing aromatic groups having 6 to 30 carbon atoms, such as a phenyl group, alkylphenyl groups, phenylalkyl groups, phenyl groups having a (alkyl) phenyl group as a substituent, and a naphthyl group. When the polymer is used as a cement dispersant, as the number of carbon atoms of the hydrocarbon group increases, the hydrophobicity increases and the dispersibility therefore deteriorates, so, in the case where $R^2$ is the hydrocarbon group, its number of carbon atoms is favorably in the range of 1 to 22, more favorably 1 to 18, still more favorably 1 to 12, particularly favorably 1 to 4, and most favorably, $R^2$ is the hydrogen atom.

In the aforementioned general formula (2), the number of carbon atoms of the alkenyl group as represented by Y is fitly in the range of 2 to 8, favorably 3 to 8, more favorably 3 to 5. Specific examples thereof include a vinyl group, an allyl group, a methallyl group, a 3-butenyl group, a 3-methyl-3-butenyl group, a 3-methyl-2-butenyl group, a 2-methyl-3-butenyl group, a 2-methyl-2-butenyl group, and a 1,1-dimethyl-2-propenyl group. Of these, the allyl group, the methallyl group, and the 3-methyl-3-butenyl group are favorable.

The unsaturated (poly)alkylene glycol ether monomer as represented by the aforementioned general formula (2), for example, can be produced by addition of 1 to 1,000 moles of alkylene oxides to unsaturated alcohols, such as allyl alcohol, methallyl alcohol, and 3-methyl-3-buten-1-ol. Specific examples thereof include (poly)ethylene glycol allyl ether, (poly)ethylene glycol methallyl ether, (poly)ethylene glycol 3-methyl-3-butenyl ether, (poly)ethylene (poly) propylene glycol allyl ether, (poly)ethylene (poly)propylene glycol methallyl ether, (poly)ethylene (poly)propylene glycol 3-methyl-3-butenyl ether, (poly)ethylene (poly)butylene glycol allyl ether, (poly)ethylene (poly)butylene glycol methallyl ether, and (poly)ethylene (poly)butylene glycol 3-methyl-3-butenyl ether. In the present invention, these can be used either alone respectively or in combinations with each other as the monomer.

It is favorable that: a structural unit (I) derived from the unsaturated (poly)alkylene glycol ether monomer as represented by the aforementioned general formula (2) accounts for not less than 1 weight % of the entire structural units, and the ratio as accounted for by this structural unit (I) is not more than 50 mol % of the entire structural units. In the case where the ratio of the structural unit (I) is less than 1 weight %, the content of the oxyalkylene group derived from the unsaturated (poly)alkylene glycol ether monomer in the polymer is too low. On the other hand, in the case where the ratio is more than 50 mol %, the sufficient dispersibility cannot be displayed. Incidentally, the ratio as accounted for by the structural unit (I) is favorably not less than 5 weight %, more favorably not less than 10 weight %, still more favorably not less than 20 weight %, particularly favorably not less than 40 weight %, of the entire structural units.

In the present invention, peroxides are favorably used as polymerization initiators when the aforementioned monomer component is polymerized. Thereby, the coloring of the resultant polymer can be suppressed.

Examples of the aforementioned peroxides include: hydrogen peroxide; persulfate salts, such as sodium persulfate, potassium persulfate, and ammonium persulfate; and organic peroxides, such as benzoyl peroxide, lauroyl peroxide, peracetic acid, di-t-butyl peroxide, and cumene hydroperoxide. Incidentally, the amount of these peroxides as used is not especially limited. However, for example, when the hydrogen peroxide is used, its amount is favorably in the range of 2 to 10 g, more favorably 3 to 8 g, per 1 mol of the monomer component. When the persulfate salt is used, its amount is favorably in the range of 1 to 5 g, more favorably 2 to 4 g, per 1 mol of the monomer component. The aforementioned peroxides may be used either alone respectively or in combinations with each other. From the viewpoint of improving the dispersibility, it is particularly favorable that the persulfate salt and the hydrogen peroxide are jointly used in the above ranges of their respective amounts as used. In addition, although not especially limited, the method for adding these peroxides, favorably in consideration of their decomposing ability, comprises the step of continuously adding dropwise at least half the total amounts as used, more favorably the entirety thereof.

When the aforementioned monomer component is polymerized, as polymerization initiators other than the aforementioned peroxides there also can be used, for example, azo compounds such as 2,2'-azobis(2-amidinopropane) hydrochloride, 4,4'-azobis(4-cyanovaleric acid), azobisisobutyronitrile, and 2,2'-azobis(4-methoxy-2, 4-dimethylvaleronitrile). Incidentally, the polymerization initiators may be used either alone respectively or in combinations with each other.

When the aforementioned monomer component is polymerized, chain transfer agents may also be used, if necessary. Although not especially limited, examples of the chain transfer agents include sulfite salts, bisulfite salts, hypophosphite salts, mercaptopropionic acid, and thioglycolic acid. These chain transfer agents may be used either alone respectively or in combinations with each other.

Favorably for obtaining a polymer having still higher dispersibility, the polymerization concentration in polymerizing the aforementioned monomer component is not less than 20 weight %, more favorably not less than 30 weight %, still more favorably not less than 35 weight %, at the end of the addition of the entire monomer component.

The polymerization method and polymerization conditions in polymerizing the aforementioned monomer component are not especially limited, and conventional publicly-known methods may be applied in accordance with the molecular weight of the aimed polymer.

The acrylic acid (salt) polymer composition, according to the present invention, comprises an acrylic acid (salt) polymer wherein a structural unit derived from an acrylic acid (salt) accounts for not less than 10 weight % of the acrylic acid (salt) polymer, and this composition further comprises a compound, as derived from furfural, in an amount of 100 to 50,000 weight ppm. Because of the existence of the aldehyde structure in this compound as derived from the furfural, the present invention composition can display excellent dispersibility and sufficient water solubility.

The present invention acrylic acid (salt) polymer composition can easily be produced in such a manner that the product as obtained by the present invention production process is used exactly as it is. That is to say, the polymer as obtained by the present invention production process is the acrylic acid (salt) polymer wherein the structural unit derived from the acrylic acid (salt) accounts for not less than 10 weight % of the acrylic acid (salt) polymer. In addition, the aforementioned compound derived from the furfural is produced as a result that the furfural, as contained in the raw materials, changes during the polymerization reaction in the present invention production process, and therefrom it follows that such a compound is contained in the product obtained by the aforementioned production process.

Specific examples of the aforementioned compound derived from the furfural include benzoic acid, benzoate esters, furfuric acid, and furfurate esters. These compounds may be contained either alone respectively or in combinations with each other.

Although not especially limited, the content of the aforementioned acrylic acid (salt) polymer in the present invention acrylic acid (salt) polymer composition is favorably not less than 1 weight %, more favorably in the range of 1 to 99 weight %, still more favorably 2 to 50 weight %.

The present invention acrylic acid (salt) polymer composition may further comprise various additives that are necessary according to uses. For example, when the present invention composition is used as a detergent builder, the composition comprises the following components: the acrylic acid (salt) polymer in an amount of about 1 to about 20 weight % of the entire composition; a surfactant in an amount of about 5 to about 70 weight % of the entire composition; and various additives (for example: alkaline agents such as sodium carbonate and sodium silicate; inorganic builders such as zeolite layered silicates; enzymes; dye migration inhibitors; softeners; fluorescent agents; bleaching agents; bleaching assistants; and perfumes) in an amount of about 10 to about 70 weight % of the entire composition.

The acrylic acid (salt) polymer and the acrylic acid (salt) polymer composition, according to the present invention, have excellent dispersibility and sufficient water solubility, and accordingly can favorably be used, for example, as detergent builders, scale inhibitors, pigment dispersants, thickeners, and flocculants.

Effects and Advantages of the Invention

The present invention can easily provide: an acrylic acid (salt) polymer, which has a low molecular weight and a narrow molecular weight distribution and can display excellent dispersibility, or which has a high molecular weight and a high water solubility; and a production process that enables easy production of this polymer. In addition, the present invention can provide an acrylic acid (salt) polymer composition that displays excellent performance, for example, for various uses such as detergent builders, scale inhibitors, pigment dispersants, thickeners, and flocculants.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples.

EXAMPLE 1-1

A separable flask of 1 liter in capacity with a thermometer, a nitrogen gas-introducing tube, and a stirrer was charged with 973 g of aqueous sodium acrylate solution of 37 weight % in concentration (wherein the sodium acrylate had a furfural content of 300 weight ppm and a benzaldehyde content of 300 weight ppm) and 17 g of deionized water, and then the flask was cooled to 10±2° C. in an ice both. Thereafter, nitrogen gas was introduced into the resultant aqueous solution to therefrom remove dissolved oxygen, thereby decreasing the amount of the dissolved oxygen to not larger than 0.3 ppm. Ammonium persulfate in an amount of 0.013 weight % of the charged monomer was added to this aqueous solution, and then deionized water was added thereto to adjust the entirety of the solution to 1,000 g. The resultant aqueous solution was stirred for 10 minutes, and then the stirring was stopped, and then the flask was immersed into a thermoregulator of 35° C. to start a polymerization reaction. After 20 minutes from the beginning of the polymerization, the aqueous solution became clouded to begin gelling and, after 90 minutes, the polymerization reaction mixture indicated the maximum temperature of 89° C. After 4 hours, the resultant transparent gelled polymer was taken out, and then divided into fine pieces, and then dried under air flow of 190° C. for 80 minutes. The weight-average molecular weight and the water-insoluble content of a dried acrylic acid (salt) polymer powder as obtained in this way were measured in the following ways. The results are listed in Table 1.

(Weight-average molecular weight): This was measured by gel permeation chromatography under the following conditions:

Column: "ion park KS-806" produced by Showa Denko Co., Ltd.

Eluent: 0.1 M aqueous phosphoric acid solution (pH 7)

Detector: RI

Standard substance: poly(sodium acrylate) (produced by Sowa Kagaku Co., Ltd.; and molecular weight: 115,000 to 1,100,000)

(Water-insoluble content): 1 g of the dried polymer powder was dissolved into 500 ml of deionized water under stirred conditions, and then the resultant aqueous solution was allowed to stand still for 24 hours. Thereafter, this aqueous solution was poured over a sieve of 500 mesh, and 1 kg of deionized water was further poured. The insoluble content as left on the sieve was dried at 150° C. for 3 hours, and then the weight (x) of the dried insoluble content was measured to calculate the water-insoluble content from the following equation:

Water-insoluble content (weight %)=(x/1)×100

EXAMPLE 1-2 AND COMPARATIVE EXAMPLE 1-1

Dried acrylic acid (salt) polymer powders were obtained in the same way as of Example 1-1 except that the furfural content in the sodium acrylate was changed to the values as listed in Table 1. The time to reach the maximum temperature, the maximum temperature, and the weight-average molecular weight and the water-insoluble content measured in the same way as of Example 1-1, are listed in Table 1.

EXAMPLE 1-3 AND COMPARATIVE EXAMPLE 1-2

Dried acrylic acid (salt) polymer powders were obtained in the same way as of Example 1-1 except that the furfural content in the sodium acrylate was changed to the values as listed in Table 1; and that methyl acrylate was used as a copolymerizable component together with the sodium acrylate in a ratio of sodium acrylate/methyl acrylate=80/20 (weight ratio). The time to reach the maximum temperature, the maximum temperature, and the weight-average molecular weight and the water-insoluble content measured in the same way as of Example 1-1, are listed in Table 1.

EXAMPLE 1-4

A dried acrylic acid (salt) polymer powder was obtained in the same way as of Example 1-1 except that the furfural content in the sodium acrylate was changed to the value as listed in Table 1; and that hydroxyethyl acrylate was used as a copolymerizable component together with the sodium acrylate in a ratio of sodium acrylate/hydroxyethyl acrylate= 50/50 (weight ratio). The time to reach the maximum temperature, the maximum temperature, and the weight-average molecular weight and the water-insoluble content measured in the same way as of Example 1-1, are listed in Table 1.

with 193.0 g of deionized water, and then heated to a boiling-point-refluxing state under stirred conditions. Then, while the refluxing state was maintained, 450 g of aqueous sodium acrylate solution of 80 weight % in concentration (wherein the sodium acrylate had a furfural content of 300 weight ppm, a benzaldehyde content of 300 weight ppm, and a methoxyhydroquinone content of 80 weight ppm), 114.3 g of aqueous hydrogen peroxide solution of 35 weight % in concentration, 133.3 g of aqueous sodium persulfate solution of 15 weight % in concentration, and 333.3 g of aqueous sodium hydroxide solution of 48 weight % in concentration were continuously dropwise added thereto from their respective separate dropping nozzles at constant speeds over periods of 180 minutes, 90 minutes, 190 minutes, and 180 minutes respectively. After all the dropwise additions had been completed, the boiling-point-refluxing state was maintained for 40 minutes to complete the polymerization. Thereafter, while the boiling-point-refluxing state was further maintained for 30 minutes, 62.5 g of aqueous sodium hydroxide solution of 48 weight % in concentration was gradually dropwise added thereto under stirring to make such a neutralization that the final neutralization degree would be 95%. The weight-average molecular weight, the dispersion degree, and the clay dispersibility of the acrylic acid (salt) polymer as obtained in this way were measured in the following ways. The results are listed in Table 2.

(Weight-average molecular weight): This was measured by gel permeation chromatography under the following conditions:

Column: "G-3000PWXL" produced by Tosoh Corporation

Eluent: an aqueous solution as prepared by: adding deionized water to 34.5 g of disodium hydrogenphosphate dodecahydrate and 46.2 g of sodium dihydrogenphosphate dihydrate to adjust the total weight to 5,000 g; and then filtering the resultant mixture with a membrane filter of 0.45 micron.

Detector: UV (214 nm)

Standard substance: poly(sodium acrylate) (produced by Sowa Kagaku Co., Ltd.; and molecular weight: 115,000 to 1,100,000)

(Dispersion degree): The number-average molecular weight was measured in the same way as of the above weight-average molecular weight, and the dispersion degree was calculated from the following equation:

Dispersion degree=weight-average molecular weight/number-average molecular weight

TABLE 1

|  | Furfural (weight ppm) | Maximum temperature (° C.) | Time to reach maximum temperature (minutes) | Weight-average molecular weight (×10$^4$) | Water-insoluble content (weight %) |
|---|---|---|---|---|---|
| Example 1-1 | 300 | 89 | 90 | 105 | 0.2 |
| Example 1-2 | 200 | 81 | 87 | 98 | 0.3 |
| Example 1-3 | 250 | 76 | 105 | 76 | 0.9 |
| Example 1-4 | 150 | 90 | 100 | 60 | 0.3 |
| Comparative Example 1-1 | 0.1 | 94 | 85 | 70 | 5.8 |
| Comparative Example 1-2 | 0.1 | 72 | 110 | 65 | 5.7 |

EXAMPLE 2-1

A SUS-made separable flask of 2.5 liters in capacity with a thermometer, a reflux condenser, and a stirrer was charged (Clay dispersibility): First of all, a glycine buffer was prepared by adding deionized water to 67.56 g of glycine, 52.6 g of sodium chloride, and 60 ml of aqueous sodium hydroxide solution (1 mol/L) in order to adjust the total weight to 600 g. Next, deionized water was added to 60 g of the resultant glycine buffer and 0.3268 g of calcium chloride dihydrate in order to adjust the total weight to 1,000 g, thus preparing a dispersion. Next, 0.3 g of clay of 8 types of JIS test dust I (Kanto loam, fine particles, available from Japan Powder Industrial Technical Society) was placed into a test tube of 30 cc. Thereto, 27 g of the above dispersion and 3 g of the aqueous polymer solution as prepared in the above way were added. As a result, the calcium concentration in the test tube was 200 weight ppm in terms of calcium carbonate. This test tube was sealed with a parafilm, and then shaken up and down 20 times so that the clay would be dispersed all over. This test tube was then allowed to stand still for 20 hours in a place that was not exposed to direct sunlight. Thereafter, 5 ml of supernatant in the test tube was sampled with a whole pipet. Then, the absorbance of the supernatant was measured with a UV spectroscope (wavelength: 380 nm) having a cell of 1 cm, and the clay dispersibility was evaluated by the thus-measured value.

EXAMPLE 2-2 AND COMPARATIVE EXAMPLE 2-1

Acrylic acid (salt) polymers were obtained in the same way as of Example 2-1 except that the furfural content in the sodium acrylate was changed to the values as listed in Table 2. The weight-average molecular weight, the dispersion degree, and the clay dispersibility measured in the same way as of Example 2-1 are listed in Table 2.

EXAMPLE 2-3 AND COMPARATIVE EXAMPLE 2-2

Acrylic acid (salt) polymers were obtained in the same way as of Example 2-1 except that the furfural content in the sodium acrylate was changed to the values as listed in Table 2; and that hydroxyethyl acrylate was used as a copolymerizable component together with the sodium acrylate in a ratio of sodium acrylate/hydroxyethyl acrylate=50/50 (weight ratio). The weight-average molecular weight, the dispersion degree, and the clay dispersibility measured in the same way as of Example 2-1 are listed in Table 2.

EXAMPLE 2-4

The same separable flask as used in Example 2-1 was charged with 805.5 g of deionized water, and then heated to the boiling point of the system (100° C.) under stirring. Then, 2,126.1 g of aqueous acrylic acid solution of 80 weight % in concentration (wherein the acrylic acid had a furfural content of 300 weight ppm, a benzaldehyde content of 300 weight ppm, a methoxyhydroquinone content of 80 weight ppm, a phenothiazine content of 0.3 weight ppm, and an acetic acid content of 1,000 weight ppm), 112.4 g of aqueous sodium persulfate solution of 15 weight % in concentration, and 250.4 g of aqueous sodium hypophosphite monohydrate solution of 45 weight % in concentration were dropwise added thereto from their respective separate dropping inlets over periods of 180 minutes, 185 minutes, and 180 minutes respectively. The reaction temperature was maintained at the boiling point of the system (100 to 105° C.) during the dropwise additions. After the dropwise additions had been completed, the temperature was maintained in this range for 5 minutes to complete aging. The weight-average molecular weight of the resultant polymer was 4,850.

EXAMPLE 2-5

A glass reactor with a thermometer, a stirrer, dropping funnels, and a reflux condenser was charged with 72.26 g of deionized water and 127.74 g of unsaturated alcohol (produced by addition of 50 moles of ethylene oxide to 3-methyl-3-buten-1-ol), and then heated to 65° C. Thereafter, 0.38 g of aqueous hydrogen peroxide solution of 30 weight % in concentration was added thereto. Then, 7.92 g of acrylic acid (wherein the acrylic acid had a benzaldehyde content of 100 weight ppm and a furfural content of 250 weight ppm), 0.35 g of 3-mercaptopropionic acid, and 6.99 g of aqueous L-ascorbic acid solution of 2.1 weight % in concentration were dropwise added thereto over periods of 3 hours, 3 hours, and 3.5 hours respectively. Subsequently, the temperature was maintained at 65° C. for 60 minutes to complete the polymerization reaction, and then lowered to not higher than 50° C. Then, the resultant solution was neutralized with 79.12 g of aqueous sodium hydroxide solution of 5.0 weight % in concentration, thus obtaining an aqueous solution of a polymer having a weight-average molecular weight of 25,000. Incidentally, the molecular weight was measured under the following conditions:

Weight-average Molecular Weight Measurement Conditions
  Instrument: Waters LCM1
  Detector: Waters 410
  Eluent: sort: acetonitrile/water=40/60 Vol %, pH 6.0 flow rate: 0.6 ml/min
  Columns: sort: TSK-GEL G4000SWXL+G4000SWXL+ G4000SWXL+GUARD COLUMN produced by Tosoh Corporation, 7.8×300 mm and 6.0×40 mm respectively
  Calibration curve: standardized by polyethylene glycols The content of the acrylic acid (salt) polymer having the terminal structure of the formula (1), in the polymer, was measured by proton NMR. The results are jointly listed in Table 2.

TABLE 2

| | Furfural (weight ppm) | Dispersion degree | Weight-average molecular weight | Clay dispersibility | Content of acrylic acid (salt) polymer having terminal structure of formula (1) (weight %) |
|---|---|---|---|---|---|
| Example 2-1 | 300 | 1.9 | 6,800 | 0.64 | 8.2 |
| Example 2-2 | 200 | 2.0 | 7,100 | 0.63 | 2.8 |
| Example 2-3 | 200 | 2.3 | 5,300 | 0.68 | 4.5 |
| Example 2-4 | 300 | 2.2 | 4,860 | 0.65 | 6.5 |
| Example 2-5 | 250 | 2.9 | 25,000 | 0.61 | 3.8 |

TABLE 2-continued

| | Furfural (weight ppm) | Dispersion degree | Weight-average molecular weight | Clay dispersibility | Content of acrylic acid (salt) polymer having terminal structure of formula (1) (weight %) |
|---|---|---|---|---|---|
| Comparative Example 2-1 | 0.2 | 3.0 | 7,500 | 0.48 | 0.01 |
| Comparative Example 2-2 | 0.1 | 3.1 | 5,800 | 0.51 | 0.01 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An acrylic acid (salt) polymer, of which not less than 1 weight % of the entirety is accounted for by an acrylic acid (salt) polymer having a terminal structure of a formula (1) below:

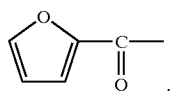
(1)

2. An acrylic acid (salt) polymer according to claim 1, which is a copolymer of monomers including acrylic acid (salt) and an unsaturated (poly)alkylene glycol ether monomer of a general formula (2) below as essential components wherein the general formula (2) is:

$$YO(R^1O)_mR^2 \qquad (2)$$

where: Y denotes an alkenyl group having 2 to 8 carbon atoms; $R^2$ denotes a hydrogen atom or a hydrocarbon group having 1 to 30 carbon atoms; $R^1O$ denotes one kind of oxyalkylene group having 2 to 18 carbon atoms or a mixture of at least two kinds of such oxyalkylene groups; and m is a molar-number-average degree of addition polymerization of the oxyalkylene groups and denotes a number of 1 to 1,000.

3. An acrylic acid (salt) polymer according to claim 1, which has a dispersion degree of not more than 3.0.

4. A production process for an acrylic acid (salt) polymer, which comprises the step of carrying out polymerization of a monomer component including an acrylic acid (salt),
wherein an acrylic acid (salt) having a furfural content of 200 to 400 weight ppm is used as at least a portion of the acrylic acid (salt) in an amount of not smaller than 10 weight % of the entire monomer component.

5. A production process according to claim 4, wherein an acrylic acid (salt) having a methoxyhydroquinone content of 40 to 160 weight ppm is used as at least a portion of the acrylic acid (salt).

6. A production process according to claim 4, wherein an acrylic acid (salt) having a phenothiazine content of 0.1 to 0.5 weight ppm is used as at least a portion of the acrylic acid (salt).

7. A production process according to claim 4, wherein an acrylic acid (salt) having an acetic acid content of 100 to 5,000 weight ppm is used as at least a portion of the acrylic acid (salt).

8. A production process according to claim 4, wherein a peroxide is further used when the polymerization is carried out.

9. An acrylic acid (salt) polymer composition, which comprises an acrylic acid (salt) polymer wherein a structural unit derived from an acrylic acid (salt) accounts for not less than 10 weight % of the acrylic acid (salt) polymer,
with the acrylic acid (salt) polymer composition further comprising a compound, as derived from furfural, in an amount of 100 to 50,000 weight ppm.

10. An acrylic acid (salt) polymer of claim 1, wherein said polymer is produced from a monomer component including acrylic acid (salt) where not less than 10 wt % of said acrylic acid (salt) has a furfural content of 200 to 400 weight ppm.

11. An acrylic acid (salt) polymer of claim 10, wherein at least a portion of said acrylic acid (salt) has a methoxyhydroquinone content of 40 to 160 weight ppm.

12. An acrylic acid (salt) polymer of claim 10, wherein at least a portion of said acrylic acid (salt) has a phenothiazine content of 0.1 to 0.5 weight ppm.

13. An acrylic acid (salt) polymer of claim 10, wherein at least a portion of said acrylic acid has an acetic acid content of 100 to 5,000 weight ppm.

14. An acrylic acid (salt) polymer having not less than 1 weight % of an acrylic acid (salt) polymer with a terminal structure of a formula (1) below:

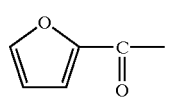
(1)

where said acrylic acid (salt) polymer is produced by polymerizing a monomer component including an acrylic acid (salt); and
where not less than 10 wt % of said monomer component is an acrylic acid (salt) having a furfural content of 200 to 400 weight ppm.

15. An acrylic acid (salt) polymer according to claim 14, wherein at least a portion of said acrylic acid (salt) has a methoxyhydroquinone content of 40 to 160 weight ppm.

16. An acrylic acid (salt) polymer according to claim 14, wherein at least a portion of said acrylic acid (salt) has a phenothiazine content of 0.1 to 0.5 weight ppm.

17. An acrylic acid (salt) polymer according to claim 14, wherein at least a portion of said acrylic acid (salt) has an acetic acid content of 100 to 5,000 weight ppm.

18. An acrylic acid (salt) polymer according to claim 14, wherein said polymerization is in the presence of peroxide.

* * * * *